March 4, 1924.

L. B. YEISER

VALVE AND FITTING

Filed Feb. 7, 1919

1,485,544

2 Sheets-Sheet 1

Witness
Geo. E. Kricker.

Inventor
Leon B. Yeiser

By Fisher & Most
Attorneys

Patented Mar. 4, 1924.

1,485,544

UNITED STATES PATENT OFFICE.

LEON B. YEISER, OF CLEVELAND, OHIO.

VALVE AND FITTING.

Application filed February 7, 1919. Serial No. 275,523.

*To all whom it may concern:*

Be it known that LEON B. YEISER, citizen of the United States, residing at Cleveland, in the county of Cuyahoga and State of Ohio, has invented certain new and useful Improvements in Valves and Fittings, of which the following is a specification.

This invention relates to improvements in a valve and fitting, and the invention is particularly applicable to bath tubs and involves a combined hot and cold water valve together with an overflow connection for a tub, which is or may be built in a wall or enclosed permanently by walls in such manner that the supply and waste pipes and the main body portions of the fitting are covered and concealed and practically inaccessible. However, with this invention the valve mechanism is exposed within the tub and accessible for operations, replacements and repairs, and provision is also made for cutting off the water automatically upon the removal of the valve mechanism from the body of the valve. The removable valve parts are also particularly constructed to permit their use in valve bodies having necks of different lengths and with a removable and replaceable valve seat, so that a valve body having a worn out seat may still be used without any change or alteration by merely interposing an auxiliary valve seat between the main valve seat and the valve stem supporting member. This auxiliary valve seat is also used to prevent the water supply from being shut off by the automatic valve when the various valve parts are assembled together and confined within the valve body.

Figure 1:
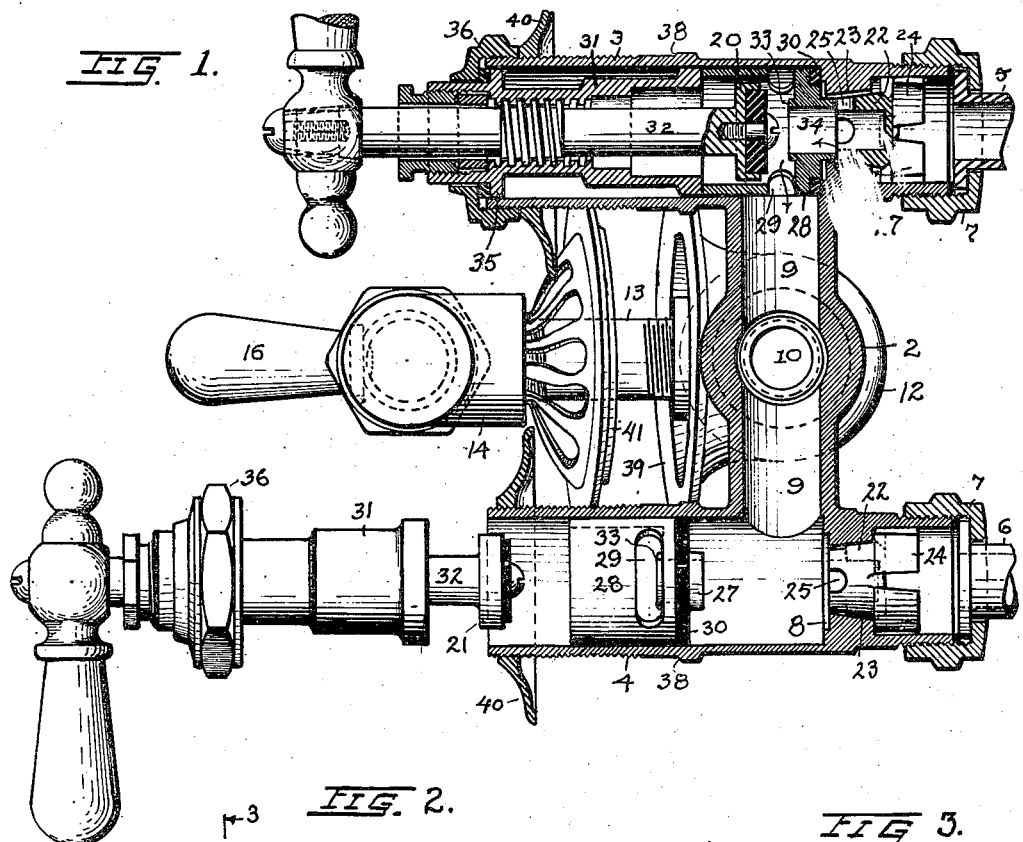
Figure 2:
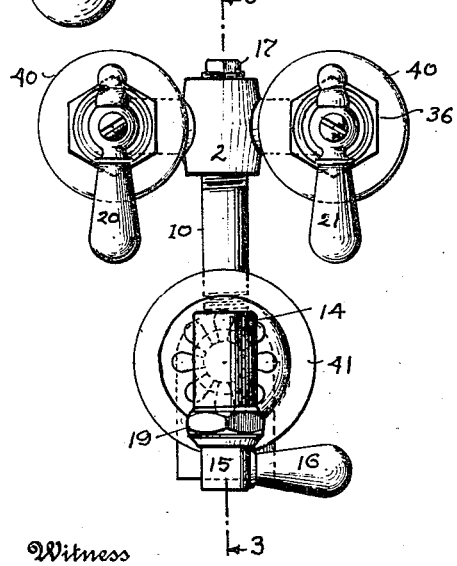
Figure 3:
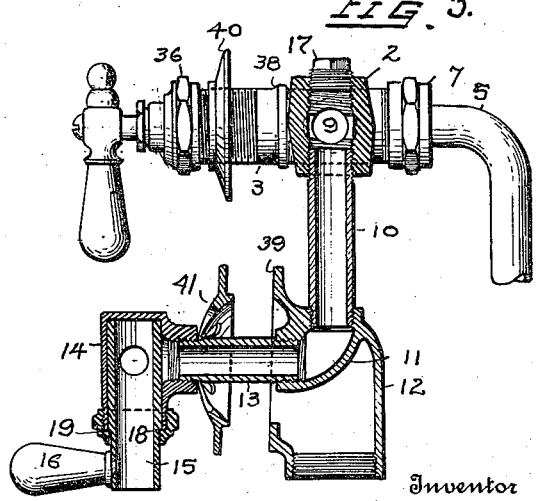
Figure 4:
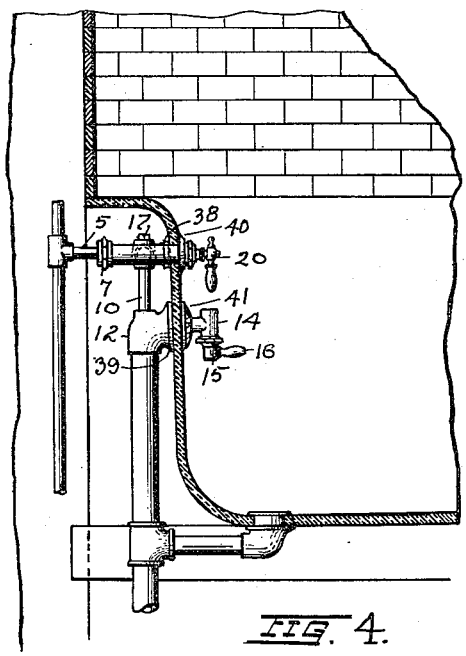
Figure 5:
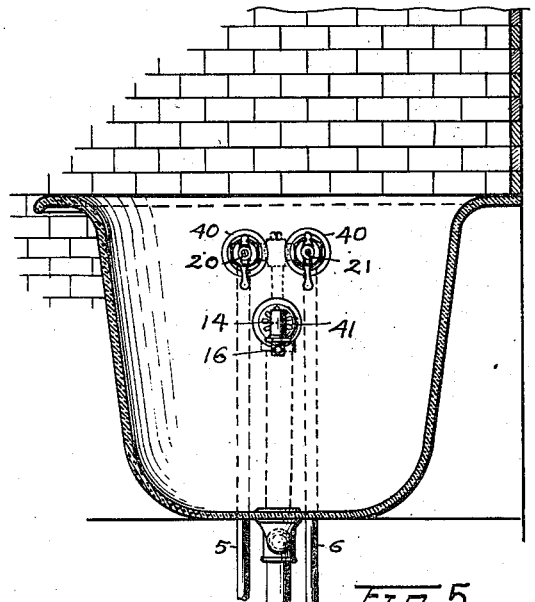
Figure 6:
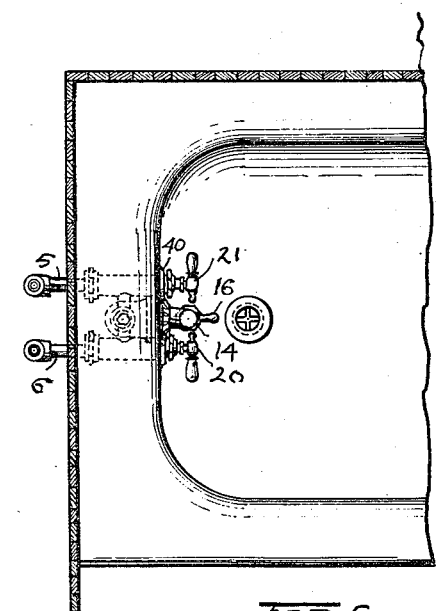
Figure 7:
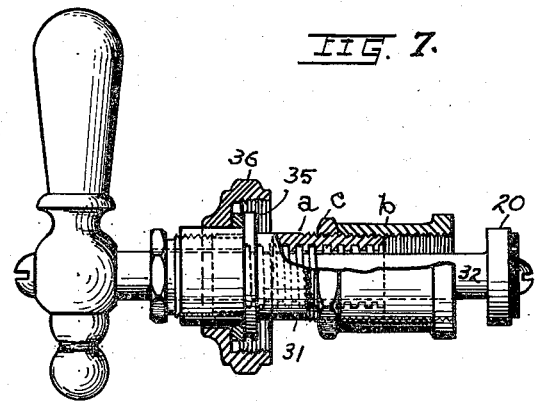

In the accompanying drawings, Fig. 1 is a horizontal section and plan view of a combined hot and cold water valve embodying my invention. Fig. 2 is a front view of the combined hot and cold water valve connected with the overflow fitting. Fig. 3 is a vertical section on line 3—3, Fig. 2. Figs. 4, 5 and 6 show my improved device mounted within the tub, Fig. 4 being a vertical section, Fig. 5 a transverse, and Fig. 6 a plan view of the tub. Fig. 7 is a side elevation partly in section of modified means for supporting the valve stem, whereby a separate valve seat may be held upon the main valve seat in the valve body.

My invention comprises a tubular cast metal body 2 having two tubular necks or extensions 3 and 4 respectively, at opposite ends thereof. These extensions are parallel with each other but at right angles to the longitudinal axis and connecting portion of the body 2 and the rear portions thereof are detachably connected with separate hot and cold water supply pipes 5 and 6, respectively by means of union nuts 7, and either a gasket or ground joint connection may be made with said pipes. A valve seat 8 is also provided within the rear end of each extension, and the water passes from the supply pipes through these seats and into the lateral outlet and connecting passage 9 where the hot and cold water mix more or less before escaping through a single central pipe connection 10 which communicates with an elbow 11 in a separate waste overflow fitting 12. A short section of pipe 13 connects this elbow 11 with a hollow body 14 having a tubular valve 15 rotatably mounted therein and serving as a spout. That is to say, valve member 15 comprises a tube having an opening in its side adapted to register with the central water passage in the short section of pipe 13 connected with fitting 12, and the lower end of this tube is open and has a handle 16 to turn it in either direction. An annular shoulder 18 upon valve member 15 is engaged by a nut 19 to hold said member rotatably within body 14. The hot and cold water may be shut off entirely or the outflow regulated by a quarter turn of valve 15 all independently of the valve mechanism for controlling the initial inflow of the hot and cold water. Moreover, the flow of water may be directed upwardly through the fitting to a shower connection by closing this single valve 15, assuming that the screw plug 17 in the top of body 2 has been removed and a shower pipe connection made in lieu thereof.

Mixing of the hot and cold water is regulated and controlled by a pair of separate valves 20 and 21 respectively, located in the front and longer ends of the extension 3 and 4 of body 2. These valves and the other parts associated therewith are exactly alike in construction and are confined and secured within or upon the body in the same way; therefore similar reference numbers have been used for corresponding parts. Thus, a check valve 22 is provided within the rear end of the extensions 3 and 4, whereby the water supply will be shut off automatically by the pressure of the water providing that the valve mechanism within the front end of said extensions is either released or removed. As shown, the check valve has a tapered body adapted to seat within the tapered entrance 23 for valve seat 8, and the check valve is provided with segmental guide portions 24 spaced apart at its rear end and a series of radial notches 25 at its front end, and the body of said check valve is chambered or hollowed at its front end to permit the water to pass out centrally therefrom. When this check valve is pressed slightly toward the rear an annular space is obtained around it through which the water may flow to reach the front notches and center opening, and the check valve is held in a retired and open position when engaged with an annular flange 27 or projecting part at the base of a separate or auxiliary valve seat or member 28.

This member comprises a hollow cylindrical body having openings 29 within its sides adapted to register with the ends of cross passage 9 in body 2 when said member 28 is thrust and held against the diaphragm or wall having annular seat 8 at its front opposite the tapering entrance 23. To promote sealing and a fluid-tight joint, member 28 is provided with a ring gasket 30 of fibre or rubber to bear against seat 8, and said member is held upon said seat by the sleeve or thimble 31 which is provided with internal screw-threads for operating the valve stem 32 relatively to the annular bead 33 which provides a raised seat for the valve internally of member 28 at the inner end of its central water passage 34. Thimble or sleeve 31 is made with an annular shoulder 35 against which a packing ring may bear, and a ring nut 36 engages and compresses this packing when screwed upon the exteriorly-threaded extremity of the body extension. Nut 36 not only compresses the packing but also presses and holds the sleeve or thimble 31 against the front edge of the valve seating member 28, thereby holding said member 28 tightly upon seat 8, and in this relation of parts the flange 27 of member 28 bears against check valve 22 to keep it apart from the tapered seat. However, when nut 36 is loosened or removed the pressure of the water against check valve 22 will tend to force said check valve to its seat and at the same time press member 28 and the sleeve or thimble 31 outwardly and away from seat 8. In this way the water is shut off the instant nut 36 is unscrewed and either valve 20 or 21 removed from its extension together with its sleeve or thimble 31. Removal of the valve permits the seating member 28 for the valve to be also removed and to be replaced if necessary if worn or to have a new gasket substituted for the old and worn gasket. Furthermore, by utilizing a separate or auxiliary seating member 28, in combination with a valve and the removable sleeve or thimble 31 I am enabled to use an old valve body already installed in a bath tub or any lavatory fitting without disconnecting the fitting from its pipe connection nor disturbing it or the parts upon or within which it is mounted. It is only necessary to insert the seating member 28 so that it may engage the old valve seat in the valve body and then press and hold it to this seat by introducing the valve and its supporting sleeve 31 and then screwing and tightening up the nut 36.

In attaching my improved valve and overflow fitting to a bath tub the first step is to introduce the extensions 3 and 4 and the short pipe 13 into and through the usual openings provided in the end wall of the tub until shoulders 38 on the extensions 3 and 4 and the flange 39 on the overflow fitting 12 bear against the outside face of the wall. Screw flanges 40 on the extensions are then turned to clamp and hold the body rigidly upon the tub. An open guard plate 41 is also usually sleeved upon pipe 13 opposite the overflow opening in fitting 12.

In Fig. 7 I show a slightly modified form of thimble or sleeve for the water regulating valves, in that this sleeve is made of two parts $a$ and $b$ respectively, mounted for longitudinal adjustment upon each other by a screw-threaded connection and is further equipped with a lock nut $c$ to fix any predetermined adjustment of the parts. The idea of this arrangement of parts is to assure positive seating of the sleeve or thimble and the valve seating member 28 when assembled within the valve body. Thus, the extensions may be of varying length and the thimble or sleeve parts $a$ and $b$ adjusted longitudinally to produce absolutely tight seating effects of the valve seat member 28 upon seat 8 as well as absolute tight sealing effects at the joint which must be sealed by compression of the gasket within nut 36.

What I claim is:

1. A valve body having a pair of tubular extensions with separate water inlets and a common water outlet, a replaceable valve seat within each extension, a check valve within each water inlet engaged and held open by said valve seat, a longitudinally-movable valve opposite each valve seat, and means for jointly supporting said valve and the replaceable valve seat within each extension.

2. A valve body having a pair of tubular extensions provided with separate water supply connections and a common outlet, a main valve having a separate seat removably mounted within each extension to control the flow of water therethrough to said common outlet, and a check valve supplementing each main valve adapted to shut off the water supply thereto when said seat is removed from the extension.

Signed at Cleveland, in the county of Cuyahoga, and State of Ohio, this 28th day of January, 1919.

LEON B. YEISER.